(12) United States Patent
Sohnis et al.

(10) Patent No.: US 9,397,842 B2
(45) Date of Patent: Jul. 19, 2016

(54) SYSTEM AND METHOD FOR CONTROLLING AN ELECTRICALLY ACTUATED DEVICE

(71) Applicant: ALTRONIX CORPORATION, Brooklyn, NY (US)

(72) Inventors: Jonathan Sohnis, Brooklyn, NY (US); Victor Pesok, Brooklyn, NY (US)

(73) Assignee: Altronix Corporation, Brooklyn, NY (US)

( * ) Notice: Subject to any disclaimer, the term of this patent is extended or adjusted under 35 U.S.C. 154(b) by 43 days.

(21) Appl. No.: 14/580,953

(22) Filed: Dec. 23, 2014

(65) Prior Publication Data

US 2016/0112211 A1 Apr. 21, 2016

Related U.S. Application Data

(60) Provisional application No. 62/064,223, filed on Oct. 15, 2014, provisional application No. 62/064,637, filed on Oct. 16, 2014.

(51) Int. Cl.
*H04B 3/00* (2006.01)
*H04L 12/10* (2006.01)
*G08B 17/06* (2006.01)

(52) U.S. Cl.
CPC ............. *H04L 12/10* (2013.01); *G08B 17/06* (2013.01)

(58) Field of Classification Search
CPC  G06F 1/266; Y02B 20/48; H04B 2203/5458; H04B 3/54; H04L 25/0264; H04L 25/0272; H04L 25/0292; H04L 12/10; G08B 17/06
USPC .......................................... 708/188; 375/257
See application file for complete search history.

(56) References Cited

U.S. PATENT DOCUMENTS

2008/0218330 A1* 9/2008 Biles ...................... G08B 25/14
340/506

* cited by examiner

*Primary Examiner* — Tesfaldet Bocure
(74) *Attorney, Agent, or Firm* — Kelley Drye & Warren LLP

(57) ABSTRACT

Systems and methods for powering and controlling an electrically actuated device, such as a door lock, via a structured cable, such as an Ethernet cable, are disclosed. The system may include a receiver which transmits Internet Protocol (IP) control signals and non-IP alarm trigger signals over a structured cable to a transceiver. Both types of signals may be transmitted over the structured cable without interruption, and used to control a device. The IP and non-IP signals may be transmitted over the same structured cable to provide device control for non-alarm and alarm condition device actuation, respectively.

20 Claims, 4 Drawing Sheets

SYSTEM AND METHOD FOR CONTROLLING AN ELECTRICALLY ACTUATED DEVICE

CROSS REFERENCE TO RELATED APPLICATIONS

This application relates to, and claims the benefit of the earlier filing date and priority of U.S. Provisional Patent Application No. 62/064,223, filed on Oct. 15, 2014, entitled "System and Method for Electric Control of Remote Device," and U.S. Provisional Patent Application No. 62/064,637, filed on Oct. 16, 2014, entitled "System and Method for Electric Control of Remote Device."

FIELD OF THE INVENTION

The present invention relates to methods and systems for control of an electrically powered device using IP and non-IP control signals transmitted over a structured cable connection.

BACKGROUND

A Fire Alarm Control Panel (FACP), or Fire Alarm Control Unit (FACU), referred to herein collectively as a FACP, is the controlling component of a fire alarm system. The FACP may communicate with environmental sensors which detect changes indicating a fire condition. The FACP may also monitor operational integrity of such sensors and control of equipment in case of a fire condition.

Access control systems may be used to prevent rooms or other areas from being visited by unauthorized persons. Such systems typically include an electrically operated door strike and/or magnetic lock, an access input device mated with the door strike or lock, a central computer, and a local controller configured to operate the door strike and/or lock. Such access control systems may include a network of Ethernet cable connecting elements such as the central computer and the local controllers. It is also known to power such devices using Power over Ethernet (PoE) and to send control signals in Internet Protocol (IP) format.

There is a need for FACP systems and access control systems to function cooperatively. Namely, in the event of a fire or other alarm condition, an alarm signal issued by the FACP must be capable of overriding the control of door strikes and locks. With reference to FIG. 1, in prior art systems a central computer 100 was connected via a structured Ethernet cable 110 to a device controller, such as a door controller 200. In turn the device controller 200 was connected via a wire pair 320 to the controlled device, such as a door strike or lock. The device controller 200 of these systems also needed to be responsive to the control of an FACP 400. However, due to the fact that the FACP control signal (i.e., trigger output signal) is a non-IP signal which presents a short or open upon alarm and may present a voltage as well, is not compatible to be delivered via a structure cable using standard Ethernet signaling protocol, each individual device controller 200 had to be connected to the FACP 400 via a wire pair 410. The need to run a wire pair 410 to each device controller often resulted in excessive wiring costs and challenges. Therefore there is a need to provide an FACP with the ability to control a device without incurring excessive wiring costs and challenges.

BRIEF DESCRIPTION OF THE DRAWINGS

In order to assist the understanding of this invention, reference will now be made to the appended drawing, in which like reference numerals refer to like elements. The drawing is exemplary only, and should not be construed as limiting the invention.

SUMMARY OF THE INVENTION

Figure 1:
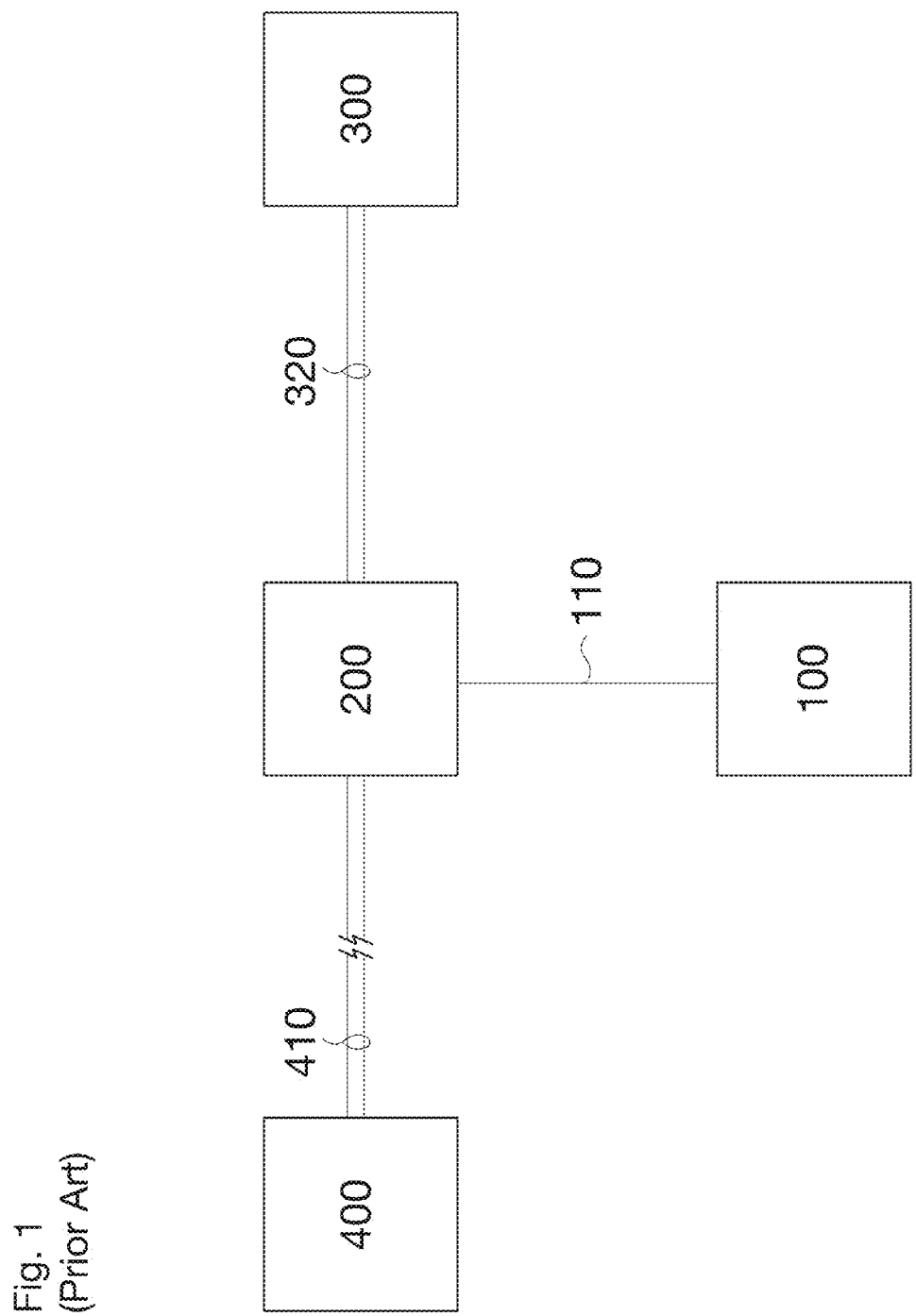
FIG. 1 is a schematic diagram of a prior art door control system.

Responsive to the foregoing challenges, Applicant has developed an innovative system for controlling an electrically actuated device via a structured cable, the system comprising: a first receiver having a structured cable input port, a Fire Alarm Control Panel (FACP) input port, and a structured cable output port, said first receiver adapted to: receive Ethernet Internet Protocol (IP) signals over structured cable; receive FACP non-IP trigger signals; transmit Ethernet IP signals over structured cable; and transmit non-IP analog trigger signals, based on the FACP non-IP trigger signals, over structured cable; a first transceiver having a structured cable input port and a device power output port, said first transceiver adapted to: receive the Ethernet IP signals over structured cable; receive the non-IP analog trigger signals over structured cable; and transmit or remove power to actuate said device responsive to the Ethernet IP signals and the non-IP analog trigger signals; and a first structured cable connecting the first receiver and the first transceiver.

Applicant has further developed an innovative kit for controlling an electrically actuated device via an Ethernet connection, the kit comprising: a first receiver having a structured cable input port, a Fire Alarm Control Panel (FACP) input port, and a structured cable output port, said first receiver adapted to: receive Ethernet Internet Protocol (IP) signals over structured cable; receive FACP non-IP trigger signals; transmit Ethernet IP signals over structured cable; and transmit non-IP analog trigger signals, based on the FACP non-IP trigger signals, over structured cable; and a first transceiver having a structured cable input port and a device power output port, said first transceiver adapted to: receive the Ethernet IP signals over structured cable; receive the non-IP analog trigger signals over structured cable; and transmit or remove power to actuate said device responsive to the Ethernet IP signals and the non-IP analog trigger signals.

Applicant has still further developed an innovative method of controlling the electrically controlled device comprising: receiving, at the receiver, an IP control signal for the device; transmitting the IP control signal from the receiver to the transceiver via a structured cable; transmitting electrical power sufficient to power the device from the transceiver to the device responsive to receipt of the IP control signal; transmitting a non-IP control signal for the device from the FACP to the receiver; transmitting the non-IP control signal or an analog of said non-IP control signal from the receiver to the transceiver via the structured cable; and transmitting or removing electrical power to the device under the control of the transceiver responsive to receipt of the non-IP control signal or the analog of said non-IP control signal at the transceiver.

It is to be understood that both the foregoing general description and the following detailed description are exemplary and explanatory only, and are not restrictive of the invention as claimed.

DETAILED DESCRIPTION OF PREFERRED EMBODIMENTS OF THE INVENTION

Figure 2:
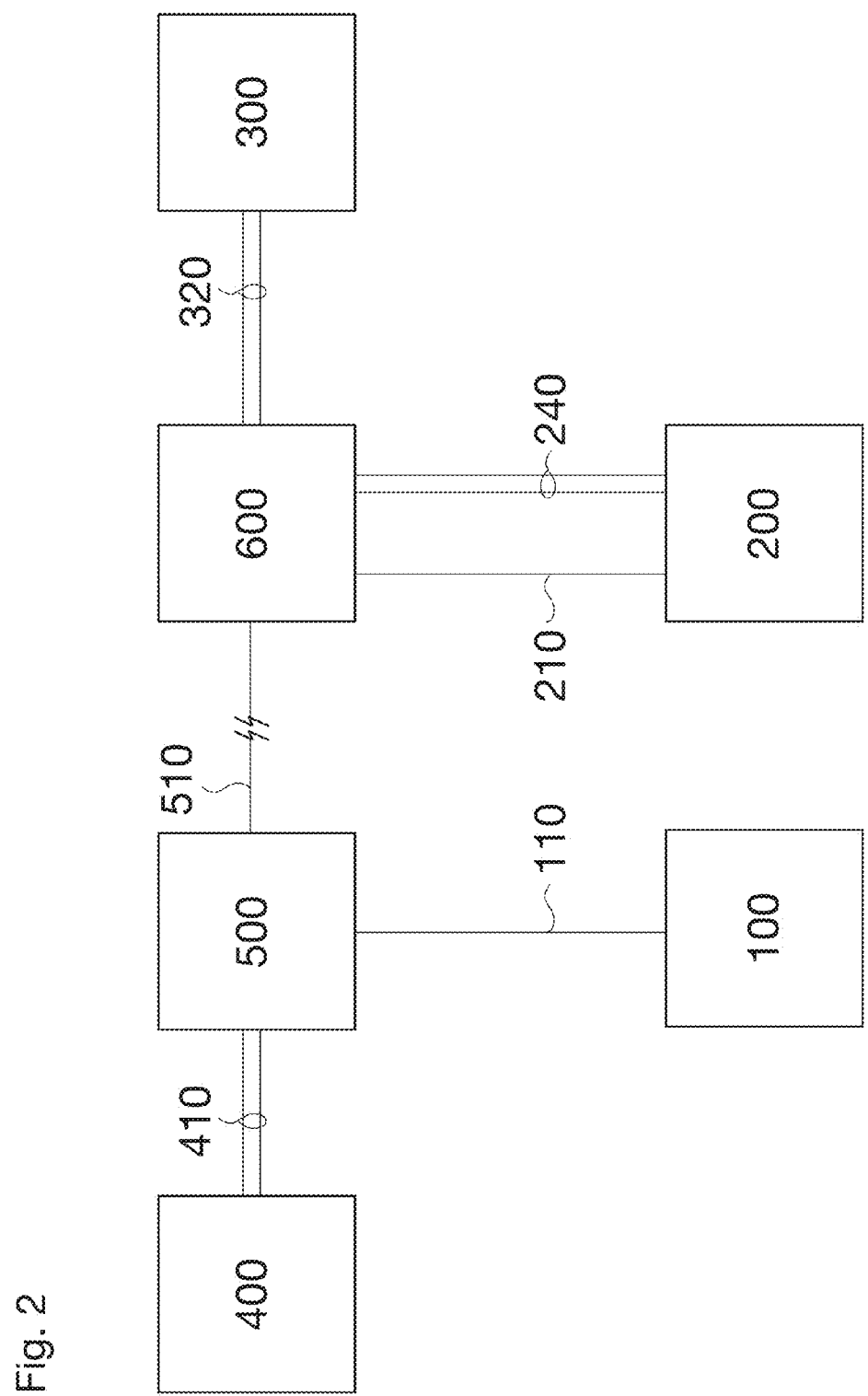
FIG. 2 is a schematic diagram of a device or door control system in accordance with a first embodiment of the present invention.

Reference will now be made in detail to a first embodiment of the present invention, an example of which is illustrated in FIG. 2. With reference to FIG. 2, the overall system may provide control for an electrically actuated device, such as a magnetic door lock or strike, during both alarm and non-alarm conditions. The system may include a computer 100 connected via a midspan or endspan structured cable 110, such as but not limited to, a CAT5, CAT5e, CAT6, or other type of Ethernet cable, to a receiver 500. The receiver 500 may be adapted to receive and transmit Ethernet IP signals used to control a device 300 received from the computer 100.

The receiver 500 may also be connected to a Fire Alarm Control Panel (FACP) via a wire pair 410. The FACP may be adapted to send non-IP trigger signals via the wire pair 410 to the receiver 500 responsive to an alarm condition. The receiver 500 may be adapted to receive the non-IP trigger signals and create and transmit a non-IP analog trigger signal based on a FACP non-IP trigger signal.

The receiver 500 may be further connected via a structured cable 510 to a transceiver 600. In particular, the receiver 500 may be adapted to transmit the non-IP analog trigger signal to the transceiver 600 without interrupting the transmission of Ethernet IP signals to the transceiver, and in some embodiments, without interrupting the transmission of PoE power to the transceiver.

In order to compliment the function of the receiver 500, the transceiver 600 may be adapted to receive both Ethernet IP signals and the non-IP analog trigger signal based on the FACP non-IP trigger signal from the receiver 500 over the structured cable 510. In particular, the transceiver may be adapted to receive both types of such signals, and in some embodiments PoE power, from the receiver 500 without interruption.

The transceiver 600 may be connected to a device controller 200 via a structured cable 210 and a wire pair 240. The transceiver 600 may be further adapted to transmit Ethernet IP signals to the device controller 200 via the structured cable 210 and to transmit power to actuate a controlled device 300 via a wire pair 320. More specifically, the transceiver 600 may be connected to the controlled device 300 via a wire pair 320. Ethernet IP signals used to control the controlled device 300 may be received from the receiver 500 at the transceiver 600 and transmitted over the structured cable 210 to the device controller 200. In response thereto, the device controller 200 may transmit device control signals to the transceiver 600 via the wire pair 240. In response to receipt of such device control signals, the transceiver may transmit power to actuate the controlled device 300 over the wire pair 320.

The system shown in FIG. 2 may be used as follows to control and power an electrically controlled device such as a magnetic lock, door strike, or camera. During non-alarm conditions, the computer 100 may be used to automatically, or in response to user input, send Ethernet IP signals to the receiver 500. The Ethernet IP signals received at the receiver 500 may provide information which will result in the actuation of the controlled device 300. The Ethernet IP signals may be transmitted from the receiver 500 over the structured cable 510 to the transceiver 600. In turn, the Ethernet IP signals may be transmitted from the transceiver 600 to the device controller 200. The device controller may include internal logic which interprets the Ethernet IP signals and responsive thereto causes a device control signal to be transmitted over the wire pair 240 to the transceiver 600. The transceiver 600 may then transmit or remove power to actuate the controlled device 300 over the wire pair 320 responsive to receipt of a device control signal. For example, if the device is a door lock, it may be designed to unlock as the result of transmission of power to the door lock, or alternatively as the result of removal of power to the door lock. Thus, either transmission of power or removal of power may result in door lock "actuation."

In the event of an alarm condition identified by the FACP 400, a non-IP FACP trigger signal may be automatically transmitted from the FACP 400 to the receiver 500 via the wire pair 410. In response to receipt of the non-IP FACP trigger signal, the receiver may create and transmit a non-IP analog signal, based on the non-IP FACP trigger signal, to the transceiver 600 via the structured cable 510. The transceiver 600 may then transmit power to actuate the controlled device 300 over the wire pair 320 responsive to receipt of the non-IP analog signal. In this manner, the same structured cable 510 may be used to provide both alarm and non-alarm signals for control of the controlled device 300.

In alternative embodiments to that shown in FIG. 2, the functions of the transceiver 600 and device controller 200 may be combined in a single hardware unit or package, thereby eliminating the need for the external connections provided by the structured cable 210 and wire pair 240. In still further alternative embodiments, the receiver 500 and transceiver 600 may be PoE enabled devices which are adapted to transmit, and optionally receive, PoE power to and from other devices. For example, the receiver 500 may receive PoE power from the computer 100, or in the alternative, be self-powered. Further, the receiver 500 may transmit PoE power to the transceiver 600 if the transceiver 600 is not self-powered. In like fashion, the transceiver 600 may transmit PoE power to the device controller 200.

Figure 3:
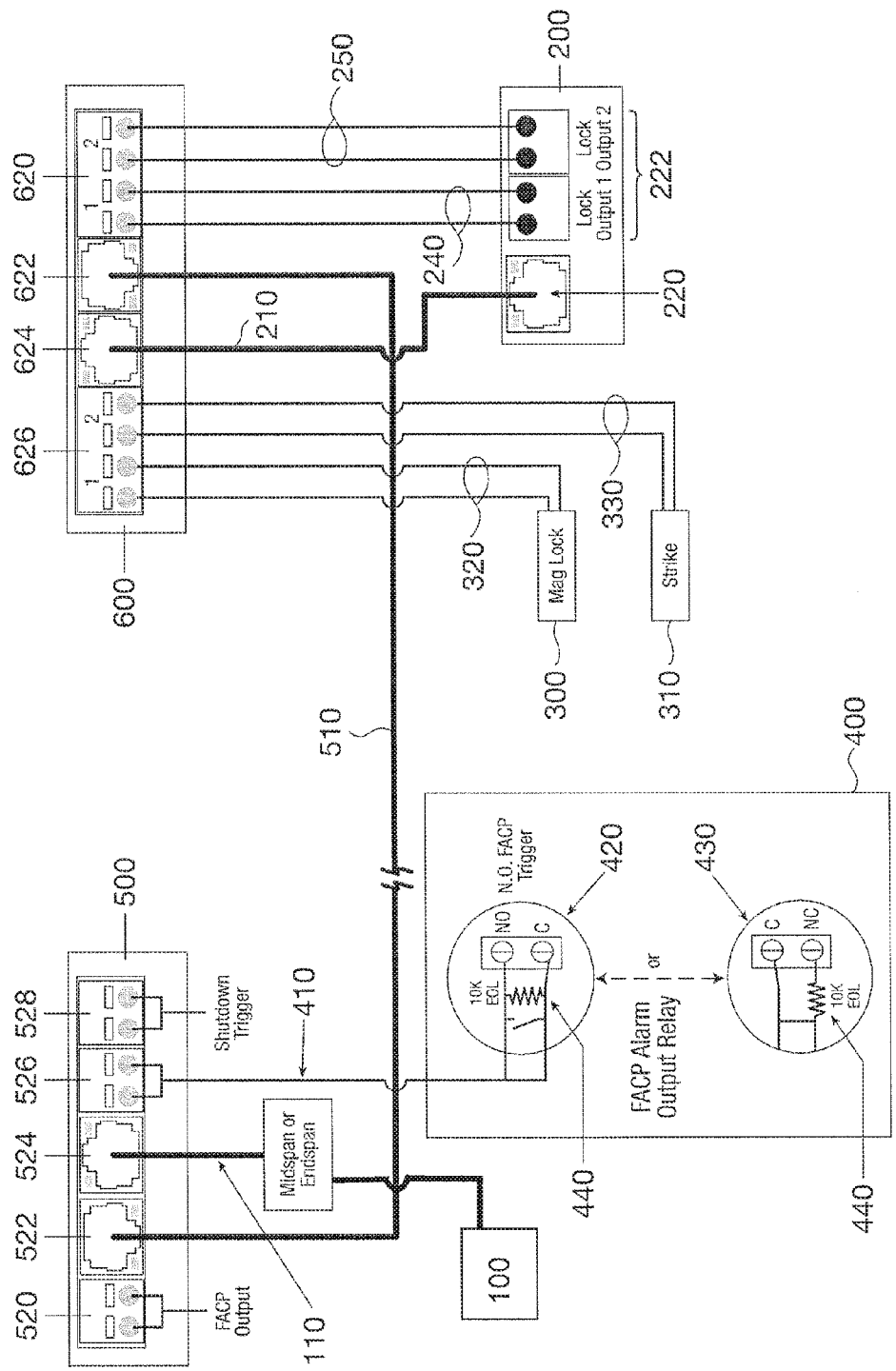
FIG. 3 is a detailed schematic diagram of a device or door control system in accordance with a second embodiment of the present invention.

A preferred second embodiment of the invention is illustrated in FIG. 3. With reference to FIG. 3, the overall system may provide power and control for an electrically actuated device such as a magnetic door lock or strike. The power and control system may include a computer 100 connected by a structured cable 110 to a PoE receiver 500 at a structured cable input port 524. The computer 100 may be programmed to provide IP control signals, and optionally PoE delivered power, to the PoE receiver 500 over the structured cable 110. In alternative embodiments, the PoE receiver 500 may be self-powered such that PoE power is not required to be received from the computer 100.

The PoE receiver 500 may have a FACP input port 526 for connection to a FACP 400 via a wire pair or like connection 410. Reference is made throughout the description of embodiments of the invention having various input and output ports. Such ports are intended in refer to one or more individual connection points provided for a hardware device for receiving or delivering information and/or power, regardless of whether such ports require single or multiple connections, and regardless of the means for delivering the information or power, including without limitation electrical signals and power, infra-red signals, optical signals, audible signals, and any other signals which may be received by a hardware device.

The PoE receiver 500 may further include a FACP output port 520, a structured cable output port 522, and a shutdown trigger port 528. The PoE receiver 500 may be adapted to transmit IP signals, non-IP analog signals of non-IP FACP trigger signals, and in a preferred embodiment, PoE power, from the structured cable output port 522. The PoE receiver 500 may be further adapted to transmit non-IP FACP trigger signals from the FACP output port 520. The PoE receiver 500 may be still further adapted to receive a manual (e.g., user activated switch) shutter down trigger signal at the shutdown trigger port 528.

The FACP 400 may include one or more FACP Alarm output relays 420/430. Such relays may be provided in the form of a normally open trigger 420 and/or a normally closed trigger 430. The triggers 420 and 430 may be adapted to provide a FACP non-IP trigger signal over the wire pair 410 to the PoE receiver 500. The output relays 420/430 may also be provided with a resistor 440, such as but not limited to a 10K EOL resistor, which enable the relays to provide supervised fire alarm shutdown signals. The resistor 440 may be wired in parallel fashion for a normally open FACP trigger input, or in series for a normally closed FACP trigger input. It is noted that the FACP trigger signal is preferably a "supervised" signal both in the sense of being generally monitored constantly or at discrete intervals, and in the sense of complying with recognized conformance standards for such supervised signals. The FACP trigger signals are adapted to provide a control signal to a controlled device in general and in conformance with governing standards. In the preferred embodiment of the invention, the FACP trigger signals are adapted to release electrically controlled door locks as a result of an alarm condition, such as a fire alarm.

The PoE receiver 500 structured cable output port 522 may be connected via a structured cable 510 to a PoE transceiver 600 at structured cable input port 622. The PoE transceiver 600 may be adapted to receive IP signals, non-IP analog signals of non-IP FACP trigger signals, and in a preferred embodiment, PoE power, from the PoE receiver 500 via the structured cable 510. Alternatively, the PoE transceiver 600 may be self-powered, in which case it need not be adapted to receive PoE power at the structured cable input port 622.

The PoE transceiver 600 may further include a structured cable output port 624, one or more trigger input ports 620, and one or more device power output ports 626. The PoE transceiver 600 trigger input ports 620 may be wet or dry trigger input ports. The PoE transceiver 600 may be adapted to transmit IP signals, and optionally PoE power, from the structured cable output port 624. The PoE transceiver 600 may be further adapted to receive device control input signals at the one or more trigger input ports 620, and to transmit or remove electrical power to actuate a controlled device, such as a magnetic lock or door strike, from the device power output ports 626.

The PoE transceiver 600 structured cable output port 624 may be connected via a structured cable 210 to the structured cable input port 220 of a device controller 200, such as a door controller. The PoE transceiver 600 trigger input ports 620 may be connected to one or more device controller trigger output ports 222 provided on the device controller 200 via one or more wire pairs 240 and 250. The PoE transceiver 600 device power output ports 626 may be connected via one or more wire pairs 320 and 330 to one or more electrically controlled devices 300 and 310, respectively. In the non-limiting example shown in FIG. 3, the controlled devices 300 and 310 are a magnetic lock and a door strike, respectively.

It is appreciated with regard to the foregoing description that the functions of the referenced PoE transceiver 600 and the device controller 200 may be consolidated into a single hardware unit. In such instance the combined PoE transceiver/device controller 600/200 may eliminate the need for the external structured cable 210 and wire pair 240 and 250 connections.

The system shown in FIG. 3 may be used as follows to control and power an electrically controlled device such as a magnetic lock, door strike, or camera. During non-alarm conditions, the computer 100 may be used to automatically, or in response to user input, send an Ethernet IP signal adapted to control actuation of the device 300 (i.e., an IP control signal) to the PoE receiver 500 via the structured cable 110. In response to receipt of the IP control signal, the PoE receiver 500 may transmit the IP control signal from the PoE receiver to the PoE transceiver 600 via the structured cable 510. In response to receipt of the IP control signal, the PoE transceiver 600 may transmit the IP control signal to the device controller 200 via the structured cable 210. In turn, the device controller 200 may interpret the IP control signal, and in response thereto transmit a device control signal from the device controller to the PoE transceiver 600. The transceiver 600 may then transmit power to actuate the controlled device 300 over the wire pair 320 responsive to receipt of a device control signal.

In the event of an alarm condition identified by the FACP 400, a non-IP FACP trigger signal may be automatically transmitted from the FACP 400 to the PoE receiver 500 via the wire pair 410. In response to receipt of the non-IP FACP trigger signal, the PoE receiver 500 may create and transmit a non-IP analog signal, based on the non-IP FACP trigger signal, to the PoE transceiver 600 via the structured cable 510. The transceiver 600 may then transmit or remove power to actuate the controlled device 300 over the wire pair 320 responsive to receipt of the non-IP analog signal. In this manner, the same structured cable 510 may be used to provide both alarm and non-alarm signals for control of the controlled device 300.

As noted, in alternative embodiments, PoE power may be transmitted in addition to the signals discussed above between any one or more of the computer 100, the PoE receiver 500, the PoE transceiver 600 and the device controller 200.

Figure 4:
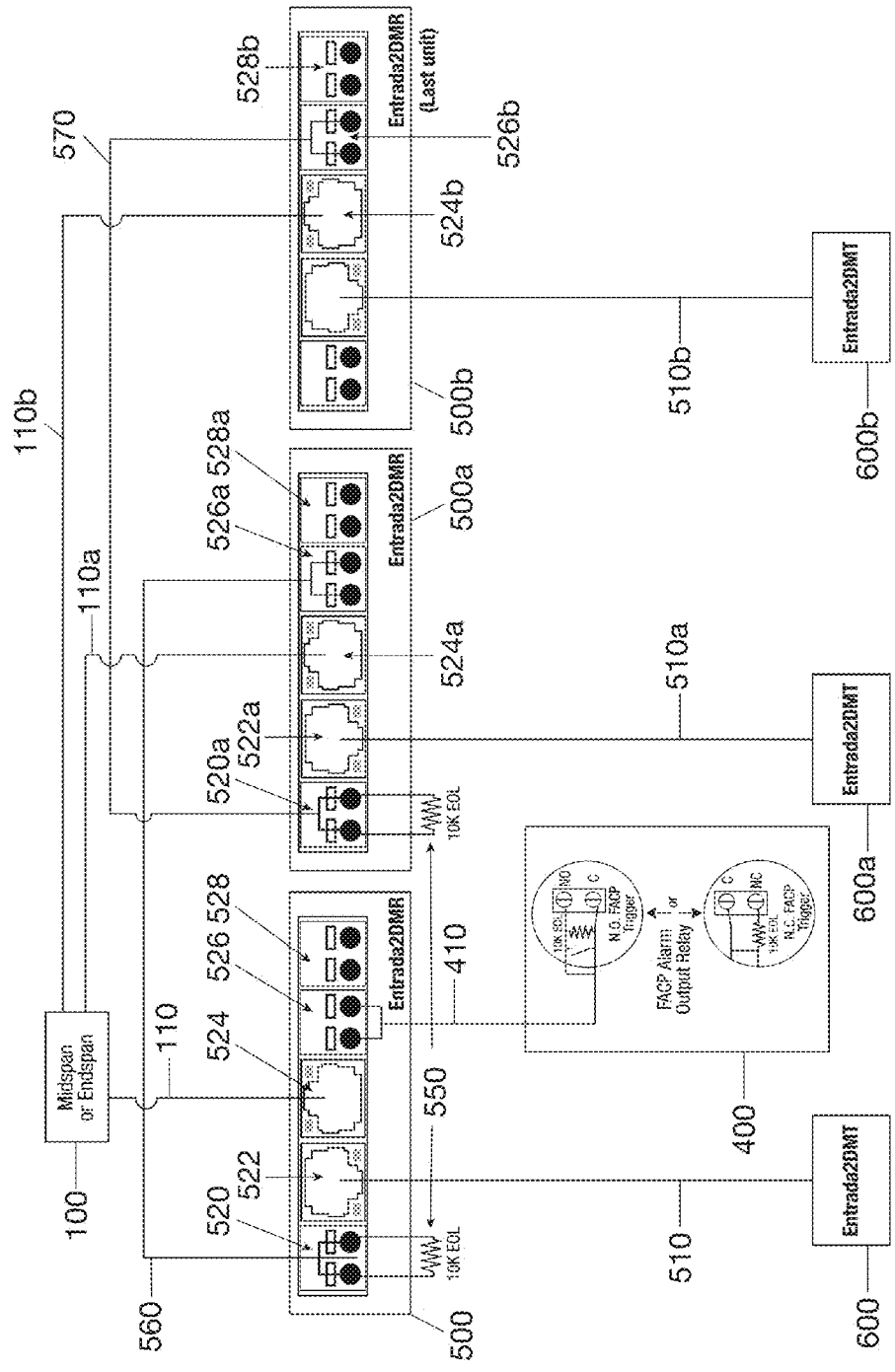
FIG. 4 is a detailed schematic diagram of a device or door control system having multiple receivers and transceivers in accordance with a third embodiment of the present invention.

FIG. 4 illustrates a third embodiment of the present invention in which a single FACP 400 may be used to trigger multiple PoE receivers 500, 500a and 500b, and multiple PoE transceivers 600, 600a and 600b. With continued reference to FIG. 4, in which like reference characters refer to like elements described in the other figures, the FACP output port 520 of a first PoE receiver 500 may be connected via a wire pair 560 to the FACP input port 526a of a second PoE receiver 500a. Further, the FACP output port 520a of the second PoE receiver 500a may be connected via a wire pair 570 to the FACP input port 526b of a third PoE receiver 500b. All of the FACP output ports 520 and 520a, except for that of the last PoE receiver 500b, may have a resistor 550 provided across the output port terminals, such as but not limited to a 10K resistor.

The system shown in FIG. 4 may be used as follows to control and power multiple electrically controlled devices using multiple PoE receivers 500, 500a and 500b, as well as multiple PoE transceivers 600, 600a and 600b. During non-alarm conditions, the computer 100 may be used to automatically, or in response to user input, send Ethernet IP signals adapted to control actuation of the multiple devices (not shown) (i.e., an IP control signals) to the PoE receivers 500, 500a, and 500b via the structured cables 110, 110a and 110b, respectively. In response to receipt of the IP control signals, the PoE receivers 500, 500a and 500b may transmit the IP control signals from the PoE receivers to the PoE transceivers 600, 600a and 600b via the structured cables 510, 510a and 510b. In response to receipt of the IP control signals, the PoE transceivers 600, 600a and 600b may transmit the IP control signals to their respective device controllers and device actuation may be carried out in the same fashion as described in connection with the FIG. 3 embodiment.

In the event of an alarm condition identified by the FACP 400, a non-IP FACP trigger signal may be automatically transmitted from the FACP 400 to the first PoE receiver 500 via the wire pair 410. In response to receipt of the non-IP FACP trigger signal, the first PoE receiver 500 may create and transmit a non-IP analog signal, based on the non-IP FACP trigger signal, to the PoE transceiver 600 via the structured cable 510. The first PoE receiver 500 may also transmit the non-IP FACP trigger signal from the FACP output port 520 to the FACP input port 526*a* of the second PoE receiver 500*a*. In turn, the second PoE receiver 500 may create and transmit a non-IP analog signal, based on the non-IP FACP trigger signal, to the second PoE transceiver 600*a* via the structured cable 510*a*. Still further, the second PoE receiver 500*a* may transmit the non-IP FACP trigger signal from the FACP output port 520*a* to the FACP input port 526*b* of the third PoE receiver 500*b*. In turn, the third PoE receiver 500*b* may create and transmit a non-IP analog signal, based on the non-IP FACP trigger signal, to the third PoE transceiver 600*b* via the structured cable 510*b*.

It will be apparent to those skilled in the art that variations and modifications of the present invention can be made without departing from the scope or spirit of the invention. It is intended that the present invention cover all such modifications and variations of the invention, provided they come within the scope of the appended claims and their equivalents.

What is claimed is:

1. A system for controlling an electrically actuated device via a structured cable, the system comprising:
   a first receiver having a structured cable input port, a Fire Alarm Control Panel (FACP) input port, and a structured cable output port, said first receiver adapted to:
     receive Ethernet Internet Protocol (IP) signals over a first structured cable;
     receive FACP non-IP trigger signals;
     transmit the Ethernet IP signals over a second structured cable; and
     transmit non-IP analog trigger signals, based on the FACP non-IP trigger signals, over structured cable;
   a first transceiver having a structured cable input port and a device power output port, said first transceiver adapted to:
     receive the Ethernet IP signals over the second structured cable;
     receive the non-IP analog trigger signals over the second structured cable; and
     transmit or remove power to actuate said device responsive to the Ethernet IP signals and the non-IP analog trigger signals; and
   the second structured cable connecting the first receiver and the first transceiver.

2. The system of claim 1, wherein the first receiver is a first PoE receiver and the first transceiver is a PoE transceiver, and wherein the first PoE receiver is adapted to transmit electrical power sufficient to power the first PoE transceiver over the second structured cable.

3. The system of claim 1, further comprising an electrically actuated device connected to the first transceiver device power output port.

4. The system of claim 3, wherein the electrically actuated device is a magnetic lock or door strike.

5. The system of claim 3, wherein the electrically actuated device is a camera.

6. The system of claim 2, further comprising:
   a structured cable output port and a trigger input port provided on the first transceiver; and
   a device controller having a structured cable input port connected to the first transceiver structured cable output port, and a device controller trigger output port connected to the first transceiver trigger input port,
   wherein the first transceiver is adapted to transmit the Ethernet IP signals over a third structured cable to the device controller.

7. The system of claim 1, further comprising:
   a structured cable output port and a trigger input port provided on the first transceiver; and
   a device controller having a structured cable input port connected to the first transceiver structured cable output port, and a device controller trigger output port connected to the first transceiver trigger input port,
   wherein the first transceiver is adapted to transmit the Ethernet IP signals over a third structured cable to the device controller.

8. The system of claim 7, further comprising a FACP connected to the first receiver FACP input port.

9. The system of claim 1, further comprising:
   a FACP output port provided on said first receiver;
   a second receiver having a structured cable input port, a FACP input port, and a structured cable output port;
   a second transceiver having a structured cable input port and a device controller trigger input port;
   a third structured cable connecting the second receiver structured cable output port to the second transceiver structured cable input port; and
   an electrical connection between the first receiver FACP output port and the second receiver FACP input port.

10. A kit for controlling an electrically actuated device via an Ethernet connection, the kit comprising:
    a first receiver having a structured cable input port, a Fire Alarm Control Panel (FACP) input port, and a structured cable output port, said first receiver adapted to:
      receive Ethernet Internet Protocol (IP) signals over a first structured cable;
      receive FACP non-IP trigger signals;
      transmit the Ethernet IP signals over a second structured cable; and
      transmit non-IP analog trigger signals, based on the FACP non-IP trigger signals, over the second structured cable; and
    a first transceiver having a structured cable input port and a device power output port, said first transceiver adapted to:
      receive the Ethernet IP signals over the second structured cable;
      receive the non-IP analog trigger signals over the second structured cable; and
      transmit or remove power to actuate said device responsive to the Ethernet IP signals and the non-IP analog trigger signals.

11. The kit of claim 10, wherein the first receiver is a first PoE receiver and the first transceiver is a PoE transceiver, and wherein the first PoE receiver is adapted to transmit electrical power sufficient to power the first PoE transceiver over the second structured cable.

12. The kit of claim 11, further comprising a structured cable output port and a trigger input port provided on the first transceiver.

13. The kit of claim 12, further comprising a FACP output port provided on the first receiver.

14. The kit of claim 10, further comprising a structured cable output port and a trigger input port provided on the first transceiver.

15. The kit of claim 10, further comprising a FACP output port provided on the first receiver.

16. In a system having a Fire Alarm Control Panel (FACP), a receiver, a transceiver, a device controller, and an electrically controlled device, a method of controlling the electrically controlled device comprising:
   receiving, at the receiver, an IP control signal for the device;
   transmitting the IP control signal from the receiver to the transceiver via a structured cable;
   transmitting electrical power sufficient to power the device from the transceiver to the device responsive to receipt of the IP control signal;
   transmitting a non-IP control signal for the device from the FACP to the receiver;
   transmitting the non-IP control signal or an analog of said non-IP control signal from the receiver to the transceiver via the structured cable; and
   transmitting or removing electrical power to the device under the control of the transceiver responsive to receipt of the non-IP control signal or the analog of said non-IP control signal at the transceiver.

17. The method of claim 16, wherein the non-IP control signal is an alarm signal.

18. The method of claim 17, wherein the receiver is a PoE receiver and the transceiver is a PoE transceiver, and wherein the PoE receiver is adapted to transmit electrical power sufficient to power the PoE transceiver over a structured cable.

19. The method of claim 18, wherein the system further comprises:
   a structured cable output port and a trigger input port provided on the transceiver; and
   a device controller having a structured cable input port connected to the transceiver structured cable output port, and a device controller trigger output port connected to the transceiver trigger input port, and
   wherein the transceiver is adapted to transmit Ethernet IP signals over structured cable to the device controller.

20. The method of claim 16, wherein the system further comprises:
   a structured cable output port and a trigger input port provided on the transceiver; and
   a device controller having a structured cable input port connected to the transceiver structured cable output port, and a device controller trigger output port connected to the transceiver trigger input port, and
   wherein the transceiver is adapted to transmit Ethernet IP signals over structured cable to the device controller.

* * * * *